3,618,445
NAIL ASSEMBLY FOR A CORROSION-PROOF
FASTENING ATTACHMENT
Manfred Hartmann, Frastanz, and Kurt Schmid, Altenstadt, Austria, assignors to Hilti Aktiengesellschaft, Schaan, Liechtenstein
Filed Sept. 10, 1969, Ser. No. 856,615
Claims priority, application Germany, Sept. 17, 1968,
P 17 75 730.1
Int. Cl. F16b 15/02
U.S. Cl. 85—10 E                 4 Claims

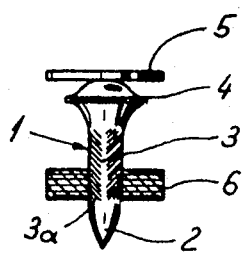
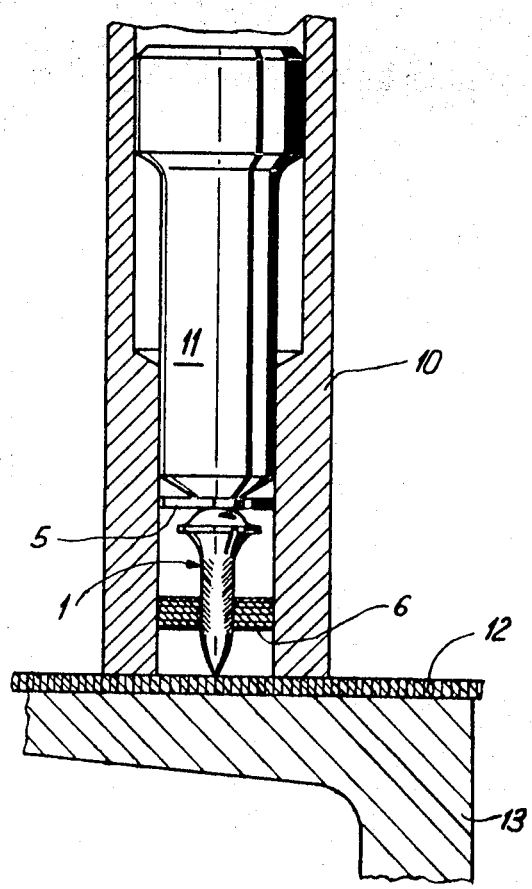
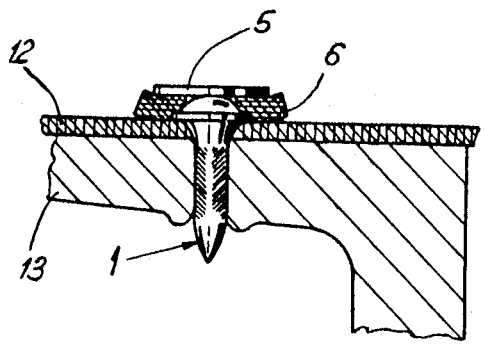

ABSTRACT OF THE DISCLOSURE

A nail assembly is formed of an axially extending shank with a driving point at one end and a head extending transversely from the shank at the other, a plastically deformable washer fitted on the shank, and a metallic plate member integrally secured to and extending laterally from the nail head. The nail assembly is used in fastening material in a corrosion-proof manner, such as wall or roof coverings, which is secured to a hard structural material and where the nail assembly is inserted by means of an explosive driven setting tool. When inserted the plate member forces the washer against the material being secured forming a seal for the opening made by the nail. In the inserted position only the plate member and the washer are exposed and they are formed of materials which prevent the development of any corrosion.

SUMMARY OF THE INVENTION

The present invention is directed to a nail used in the corrosion-proof attachment of materials and, more particularly, it is directed to a nail assembly for use with explosive power driven setting tools in which the nail assembly, as inserted, provides a corrosion-proof sealed closure.

In the attachment of a wall or roof covering to its structural support, corrosion-proof fastenings are required to close the opening formed by the nail when it is inserted. In this context, corrosion should be understood as arising from both atmospheric and contact conditions. In the past, plastic sealing caps have been used which are either screwed or hammered onto the fastening element. Where a threaded sealing cap is used, a thread must be provided on the fastening element and an additional step is required in the attachment operation. On the other hand, if sealing caps which are hammered on the fastening element are used, only a limited sealing pressure is attainable and, as a result, a completely reliable corrosion-proof cover for the fastening element is not obtained. The use of fastening elements formed of corrosion-resistant or non-corrosive materials is not practical because the poor strength characteristics of such materials does not permit their use in explosive power driven setting tools. Therefore, the primary object of the present invention, is to provide a fastening element of suitable strength and one which will afford a corrosion-proof attachment.

Another object of the invention is to utilize the members of a nail assembly which provide its corrosion-proof characteristic, as guide means when the nail assembly is being inserted by means of an explosive power driven setting tool.

Therefore, in accordance with the present invention, the problem of providing a corrosion-proof attachment is solve by a nail assembly which incorporates a small metallic plate integrally secured to the nail head and an elastically deformable washer fitted on the nail shank. The plate member extends laterally from the periphery of the nail head and when the nail assembly is driven it forces the elastically deformable washer against the member being attached so that the combination of the washer and the plate member form a closure for the nail opening formed. The metallic plate member is forced of a material which is non-corrosive or corrosion-resistant and the washer is formed of a material resistant to aging, such as an elastomer, so that, in combination, a corrosion-proof seal closure is provided across the head of the nail at the opening it has formed when it is driven through the material being attached. In addition to being effective for corrosion-proof attachment, the present invention is also economical, since the metallic plate member and the plastically deformable washer can be put together on the nail by simple means. Further, the integral securement of the plate member to the nail head secures it in position and assures the requisite force for holding the washer firmly against the material being secured in place so that the opening formed by the nail is sealed on the exterior of the attached material.

Preferably, the plate member and the washer are circular and have the same diameter so that these two parts of the nail assembly can serve as guide elements within the barrel of a setting tool in the insertion operation. Since the metal plate and washer act as guide elements, it is not necessary to provide any other guiding means which results in a simpler and more economical attachment assembly.

It is recommended that the plastically deformable washer be formed of a type of rubber which is resistant to aging and provides the necessary characteristics for effecting a tight seal, it has been found that such a material obtainable under the trade name neoprene has provided excellent results.

Setting tools for inserting nails into a target material are well known and can be divided into two types, one where the nail is driven directly into the target material by the gas pressures developed from the explosive charge, and the other is a piston type tool in which the nail is driven by a hammer piston which in turn is driven through the setting tool by the gas pressures generated from the explosive charge. Preferably, the nail assembly, in accordance with the present invention, is inserted using a setting tool of the piston type.

The various embodiments of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawing:
FIG. 1 is an elevational view, partly in section, of a nail assembly in accordance with the present invention;
FIG. 2 is a sectional view through the barrel of a setting tool illustrating the nail assembly of FIG. 1 in position to be inserted; and
FIG. 3 is a view, similar to FIG. 2, with the setting tool removed and the nail assembly inserted.

DETAILED DESCRIPTION OF THE PREFERRED EMBODIMENT

As shown in FIG. 1, a nail assembly 1 is composed of an axailly extending shank member having, at one end, a driving point 2 and, at its other end, a laterally extending head portion 4. Integrally secured to the upper surface of the head portion 4 is a metallic plate member 5 made of non-corrosive or corrosion-resistant material. The metallic plate member 5 has a diameter which is greater than the diameter of the nail head portion so that it extends laterally outwardly from the nail head portion on all sides. It is preferable to weld the plate member 5 to the head portion 4. Fitted onto the shank member 3 and extending transversely of its axis is a washer 6 made of a plastically deformable material which is resistant to aging. Since the nail assembly is used primarily in fastening wall and roof coverings to structural supports, such as steel, the surface of the shank portion is provided with appropriate knurling 3a.

In FIG. 2, the nail assembly is inserted within a barrel 10 of a setting tool which employs an explosive charge for driving the nail assembly into the target or receiving material. When the charge is exploded, a piston slidably mounted within the barrel is driven against the plate 5 of the nail assembly and in turn the nail assembly is driven into its target material. However, if the target material into which the nail assembly is to be driven will permit its use, a manually operable setting tool can be employed in which manual hammer blows are utilized in driving the guided nail assembly into its inserted position.

As indicated in the drawing, the nail assembly 1 is used for securing a plate 12 to a support 13. In FIG. 2, the front of the barrel 10 rests against the surface of the plate 12 when the nail assembly is ready to be inserted. The plate 12, which may be a face plate or wall covering, may be made of plastics, laminates, non-corrosive metals (such as aluminum) or steel sheet with a non-corrosive coating (such as zinc-plated sheet metal or sheet metal with a plastic coating), while the support 13 represents a structural element or part of a wall or roof to which the plates 12 are to be secured.

In FIG. 3, the nail assembly 1 is shown after it has been completely inserted through the plate 12 into the support 13. As the nail assembly is inserted its driving point and shank form an opening through the plate 12 and the support 13. As the shank member 3 is driven through the plate and support, the washer 6 is forced rearwardly and because of its plastically deformable character passes over the head portion 4 of the nail until it is contacted by the metallic plate member 5. Since the metallic plate member is securely attached to the nail head 4 it forces the washer 6 into tight engagement with the exterior surface of the plate 12 and provides a tight seal about the head portion for the opening which has been formed through the plate into the support. In effect, the corrosion-resistant metallic plate member 5 and the plastically deformable washer 6 which is compressed between the plate member and the plate 12 form a seal closure over the nail and its opening so that a reliable, corrosion-proof fastening of long life is effected.

What is claimed is:
1. A nail assembly for providing corrosion-proof fastenings, in particular for insertion into target materials such as steel, sheet steel and concrete using setting tools driven by explosive charges, comprising an axially extending shank having a driving point at one end and a head at the other, a metallic plate member formed of a material resistant to corrosion and extending completely across and being secured integrally to said head, said plate member extending transversely of the axis of said shank and having its outer periphery disposed laterally outwardly from the outer periphery of said head, and a washer made of a plastically deformable material resistant to aging being fitted closely on said shank and extending laterally from said shank transverse to the axis thereof, whereby said washer and plate member can serve as guidance means for the insertion of the nail assembly by a setting tool so that as the nail assembly is inserted into the target material said washer is forced rearwardly along the shank and over said head being held tightly against the target material by said plate member for affording a corrosion-proof fastening wherein said head projecting outwardly from the target material after insertion is completely enclosed by said plate member and washer to prevent any corrosion.

2. A nail assembly, as set forth in claim 1, wherein said plate member and said washer each having the same outside diameter and being disposed concentrically about the axis of said shank.

3. A nail assembly, as set forth in claim 1, wherein said washer being formed of rubber.

4. A nail assembly, as set forth in claim 1, wherein said head extending laterally outwardly from said shank, and said shank being knurled for at least a portion of its outer surface.

References Cited
UNITED STATES PATENTS

| | | | |
|---|---|---|---|
| 2,666,252 | 1/1954 | Temple | 85—10 E |
| Re. 23,786 | 2/1954 | Baisch | 85—10 E |
| 2,761,348 | 9/1956 | Williams et al. | 85—10 E |
| 3,320,845 | 5/1967 | Eschweiler | 85—10 E |
| 3,324,542 | 6/1967 | Hilti | 85—10 |
| 3,498,172 | 3/1970 | Thurner | 85—28 |

FOREIGN PATENTS

| | | | |
|---|---|---|---|
| 184,524 | 1/1956 | Austria | 85—10 E |
| 975,240 | 11/1964 | Great Britain | 85—1 JP |
| 1,028,377 | 2/1953 | France | 85—10 E |
| 310,310 | 12/1955 | Switzerland | 85—10 E |

MARION PARSONS, JR., Primary Examiner